United States Patent [19]
Watanabe

[11] Patent Number: 5,528,293
[45] Date of Patent: Jun. 18, 1996

[54] DIGITAL ELECTRONIC STILL CAMERA AND METHOD OF RECORDING IMAGE DATA IN MEMORY CARD

[75] Inventor: Mikio Watanabe, Asaka, Japan

[73] Assignee: Fuji Photo Film Co., Ltd., Kanagawa, Japan

[21] Appl. No.: 411,152

[22] Filed: Mar. 27, 1995

[30] Foreign Application Priority Data

Mar. 31, 1994 [JP] Japan ................................ 6-083574

[51] Int. Cl.$^6$ .................................................. H04N 5/76
[52] U.S. Cl. ........................... 348/231; 348/233; 348/240; 358/909.1
[58] Field of Search ................................. 348/222, 231, 348/233, 240; 358/909.1; H04N 5/76, 5/262, 5/228

[56] References Cited

U.S. PATENT DOCUMENTS 5,018,017  5/1991  Sasaki ........................... 348/233
5,067,029  11/1991  Takahashi ........................ 358/909.1

*Primary Examiner*—Safet Metjahic
*Assistant Examiner*—Sherrie Hsia

[57] ABSTRACT

Image data are recorded in a memory card in a standard DOS-FAT data file structure. When the compression mode is set, original image data is compressed in accordance with a JPEG system, and compressed image data obtained and fixed information in a JPEG header are written in the memory card so as to form a JPEG file. When the uncompression mode is set, the original image data and fixed information in a TIFF header are written into the memory card so as to form a TIFF file. Accordingly, it becomes possible to handle not only compressed image data but also original image data which is obtained in a digital electronic still camera by a lot of types of personal computers.

11 Claims, 4 Drawing Sheets

DIGITAL ELECTRONIC STILL CAMERA AND METHOD OF RECORDING IMAGE DATA IN MEMORY CARD

BACKGROUND OF THE INVENTION

1. Field of the Invention

The present invention relates to a digital electronic still camera for recording image data representing a still picture obtained by imaging in a memory card which is loaded in the camera so as to be freely loadable/unloadable.

2. Description of the Related Art

Analog electronic still cameras formerly were extensively used. At the present time, however, digital electronic still cameras are dominant. The analog electronic still camera has a solid-state electronic imaging device and subjects a video signal representing an image of a subject which is output from the imaging device to recording processing including modulation and then, recording the same in a recording medium (for example, a magnetic floppy disk) in the form of an analog signal. On the other hand, the digital electronic still camera converts an analog video signal into digital image data and records the same in a semiconductor memory contained in a memory card.

It is considered that factors which cause the digital electronic still camera to be widely used are that the camera can be made compact because the need for a rotating mechanism of a floppy disk and a transfer mechanism of a read/write head as in the analog electronic still camera is eliminated, and a memory card capable of storing large-capacity data and miniaturized is easily available. However, another important feature should not be overlooked. This feature is that an image (a picture representing a subject) can be handled by a so-called personal computer (PC) because the image is digitized (represented by digital data).

Digital image data stored in the memory card can be accepted in a personal computer to display an image on a display device connected to the personal computer. The image data accepted in the personal computer can be subjected to various types of image processing (for example, cutting of a partial image, synthesis of two or more images, and enlargement or reduction, emphasis or gradation of an image).

In order that image data representing as many frames (pictures) as possible can be stored in the memory card, image data compression processing is generally performed in the digital electronic still camera. The data compression processing makes it possible to reduce the amount of image data representing one frame.

One coding system of color still image data is a JPEG (Joint Photographic Coding Experts Group) system. An image data compression/expansion algorithm used in the JPEG system is the ADCT (Adaptive Discrete Cosine Transform) algorithm. The JPEG system is widely used in the computer industry, and is supported by a lot of types of personal computers manufactured by a lot of corporations. This ADCT algorithm is also applied to data compression/expansion processing in the digital electronic still camera. Consequently, compressed image data obtained by imaging and subjected to data compression and then, recorded in the memory card in the digital electronic still camera can be accepted in the personal computer, subjected to reproduction or other processing or stored in a file without using a reproducing apparatus dedicated to the memory card.

It is impossible to avoid slight degradation of the image quality by data compression of image data. In applications requiring high image quality, therefore, it is desirable that original image data is directly recorded in the memory card without being subjected to compression processing.

In the JPEG system, the Lothless mode in which all information included in original image data are recorded (one in which the difference between the original image data and compressed image data is written in addition to the compressed image data) is prepared. Unfortunately, an image data recording system under the Lothless mode is special and is not supported by personal computers commercially available. Image data recorded in the memory card in this system cannot be generally handled by the personal computers.

SUMMARY OF THE INVENTION

An object of the present invention is to provide a digital electronic still camera capable of recording both compressed image data and uncompressed image data (original image data) in a memory card in a form compatible with an ordinary personal computer.

A digital electronic still camera in which a memory card is loaded so as to be freely loadable/unloadable according to the present invention writes image data into a memory card in a standard DOS-FAT data file structure which can be read by a plurality of types of personal computers.

A digital electronic still camera according to the present invention comprises original image data generation means for imaging a subject to generate original image data representing an image of the subject, data compression means for compressing the original image data in accordance with a JPEG system to generate compressed image data, mode setting means for setting either one of the compression mode and the uncompression mode, storage means previously storing fixed information of a JPEG header for the compressed image data and fixed information of a TIFF header for the original image data, and image data writing means for starting the data compression means to generate the compressed image data and writing the obtained compressed image data and the fixed information of the JPEG header stored in the storage means into a memory card so that a JPEG file is formed when the compression mode is set, while writing the original image data obtained from the original image data generation means and the fixed information of the TIFF header stored in the storage means into the memory card so that a TIFF file is formed when the uncompression mode is set.

The memory card is one containing a semiconductor memory in a case, which is also referred to as a memory cartridge. It doesn't matter whether or not another circuit element, for example, a CPU or a display device is provided in the memory card.

As described above, the JPEG system is supported by a lot of types of personal computers. A lot of types of personal computers can handle compressed image data in the JPEG system.

Similarly, a TIFF system concerning original image data is also a standard system which is supported by a lot of types of personal computers (even by personal computers which differ in manufacturer). A lot of types of personal computers can handle original image data in the TIFF system.

A DOS-FAT format which is a data structure in the memory card is a standard format included in the PCMCIA standards.

The digital electronic still camera according to the present invention has the compression mode and the uncompression mode. Consequently, a user of the camera can obtain the compressed image data in the JPEG system by setting the compression mode or can obtain the original image data in the TIFF system by setting the uncompression mode.

The memory card in which such image data is recorded can be used by being unloaded from the still camera and loaded in the personal computer. Since the compressed image data and the original image data are respectively recorded in the memory card in accordance with a JPEG format and a TIFF, the image data can be read out by a lot of types of personal computers and subjected to various image processing.

In the above described manner, not only the compressed image data but also the original image data which is obtained by the digital electronic still camera can be utilized by a lot of types of personal computers.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
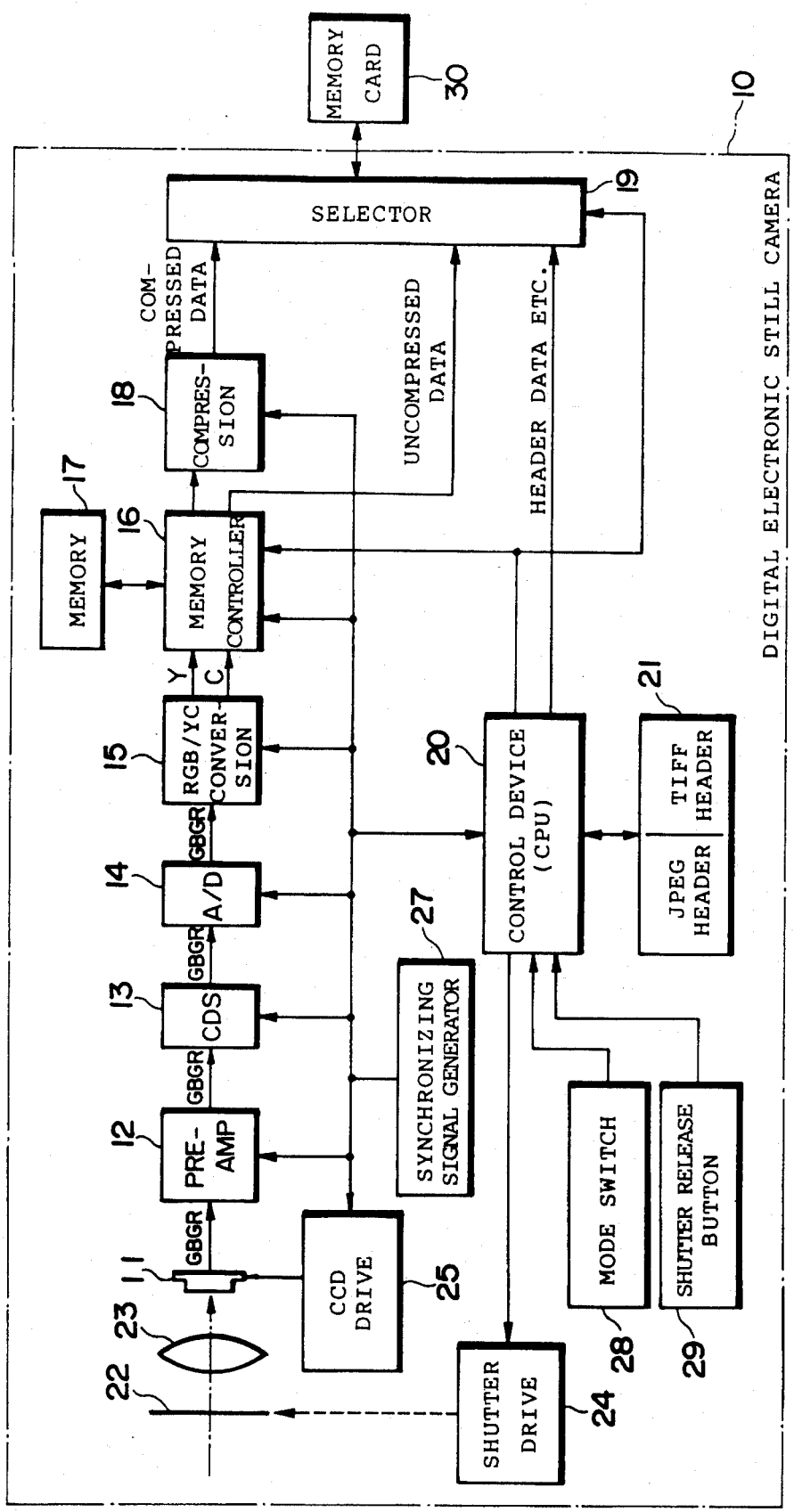
FIG. 1 is a block diagram showing the electrical construction of an electronic still camera.

FIG. 1 illustrates the electrical construction of a digital electronic still camera.

An imaging optical system comprises a mechanical shutter (of a focus plane type) 22, an imaging lens system 23, and a diaphragm (a fixed diaphragm: not shown). The shutter 22 is driven by a shutter driving circuit 24. An image representing a subject which is formed by light incident through the imaging optical system is received by a CCD (Charge-Coupled Device) 11. The CCD 11 is driven by a CCD driving circuit 25.

A control device 20 (including a CPU) for controlling recording of image data in a memory card 30 as described later carries out exposure control, focusing control, white balance control and other control. As in an ordinary digital electronic still camera, photomerry is performed in response to depression in the first stage (first stroke) of a two-stroke shutter release button 29 to determine the amount of exposure, and focusing control is carried out (a photometric element, a focusing detection element, a lens driving device and the like are not illustrated). Imaging is performed by the COD 11 in response to depression in the second stage (second stroke) of the shutter release button 29. A so-called electronic shutter function based on driving control of the CCD 11 is used with the mechanical shutter 22. A video signal representing the image formed by incident light while the shutter is opened is output from the GOD 11.

A synchronizing signal generation circuit 27 generates a clock signal, a horizontal synchronizing signal and a vertical synchronizing signal. The operations of the CCD 11, a pre-amplifier 12, a correlation double sampling circuit 13, an analog-to-digital (A/D) converter 14, a memory controller 16, a compression circuit 18 and the control device 20 are performed in synchronism with the clock signal and the synchronizing signals.

The CCD 11 includes a lot of light receiving elements disposed in a mosaic arrangement, and R (red), G (green) and B (blue) color filters are provided on light receiving surfaces of the light receiving elements. The arrangement of the color filters is repetition of GBGR in odd rows (in the horizontal direction) and repetition of GRGB in even rows. Consequently, a primary color signal (a video signal) is output from the CCD 11 onto one line in the order (GBGR . . . ) conforming to the arrangement of the color filters for each period of pixel clocks.

The output signal of the CCD 11 is input to the pre-amplifier 12. The pre-amplifier 12 has a function of amplifying the output signal of the CCD 11 and a function of adjusting color balance (white balance) in the process of the amplification. Specifically, the control device 20 outputs a signal for controlling the amplification factor so as to adjust color balance for each primary color R, G or B and applies the same to the pre-amplifier 12 on the basis of an output signal of a color sensor (not shown). The pre-amplifier 12 changes the amplification factor depending on a color (R, G or B) of a dot sequential primary color signal fed from the CCD 11 in the period of pixel clocks, to adjust white balance. An amplifier itself capable of changing the amplification factor at a high speed (7 MHz or 14 MHz) has been already known.

The dot sequential primary color signal amplified by the pre-amplifier 12 and subjected to white balance adjustment is inputted to the A/D converter 14 through the correlation double sampling circuit 13. The A/D converter 14 converts the input dot sequential primary color signal (GBGR . . . ) into digital image data for each primary color signal in the period of pixel clocks.

The digital image data (dot sequential primary color data) output from the A/D converter 14 is converted into luminance data Y and color difference data C (dot sequential data comprising color difference signals R-Y and B-Y) by an RGB/YC conversion circuit 15 in accordance with the following matrix operation expressions:

$$Y=0.3 \times R + 0.59 \times G + 0.11 \times B$$

$$R-Y=0.7 \times R - 0.59 \times G - 0.11 \times B$$

$$B-Y=-0.3 \times R - 0.59 \times G + 0.89 \times B$$

The luminance data Y and the color difference data C output from the conversion circuit 15 are stored once in a memory (DRAM) 17 under the control of the memory controller 16.

The digital electronic still camera has a mode selecting switch 28 for setting either one of the compression mode and the uncompression mode so as to be switchable. The compression mode is a mode in which the luminance data Y and the color difference data C are respectively compressed in accordance with the above described ADCT algorithm in the JPEG system and compressed data obtained are recorded in the memory card 30. The uncompression mode is a mode in which the luminance data Y and the color difference data C (original image data) are recorded in the memory card 30 without performing the above described compression processing. A mode signal from the mode selecting switch 28 is applied to the control device 20. The control device 20 controls the memory controller 16 and a selector 19 in accordance with the mode set by the mode selecting switch 28 and performs writing processing of the image data (the compressed data or the original image data) into the memory card 30.

The memory controller 16 reads out the image data (the luminance data Y and the color difference data C) stored in the memory 17 for each block comprising 8×8 pixels in response to a compression mode command from the control device 20 and applies the same to the compression circuit 18. The compression circuit 18 compresses for each block the image data applied from the memory controller 16 in accordance with the ADCT algorithm. The compressed data is applied to the selector 19.

The memory controller 16 reads out the image data (the original image data comprising the luminance data Y and the color difference data C) (uncompressed data) from the memory 17 when it receives an uncompression mode command from the control device 20 and applies the same to the selector 19.

Header data corresponding to the set mode is also input to the selector 19 from the control device 20. As described later, the compressed data or the uncompressed data and the header data are selected by the selector 19 depending on the set mode under the control of the Control device 20 and are recorded in the memory card 30.

Figure 2A:
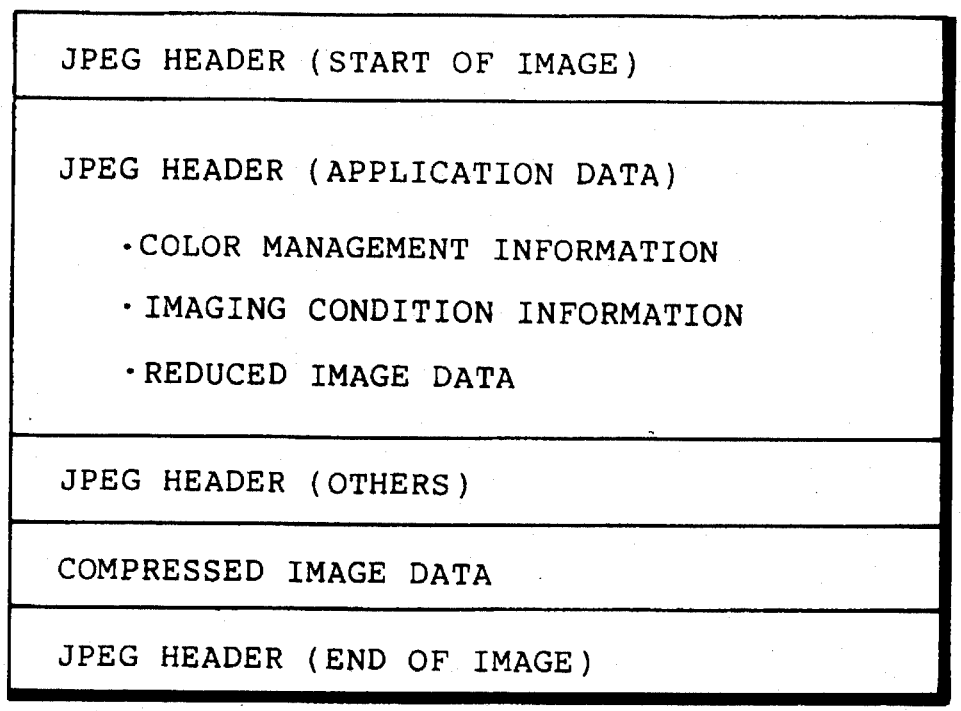
FIG. 2a shows a format of a JPEG file.

In the compression mode, the JPEG system is employed as described above. A format of a data file obtained by the JPEG system is illustrated in FIG. 2a. The JPEG file comprises a JPEG header conveniently divided into three types, compressed image data, and a final JPEG header. The first JPEG header is a code representing "start of image". The succeeding JPEG header is referred to as application data, which includes individual information of a user. Examples of the user individual information are color management information (for example, the values of parameters used in gamma processing and white balance processing), imaging condition information (for example, the amount of exposure, the focal length, or the presence or absence of strobe flashing), and reduced image data (image data representing a reduced image created by thinning the original image data). This is followed by the other headers conforming to the JPEG system. The headers are followed by the image data obtained by compression processing. Finally, the JPEG header representing "end of image" is arranged.

In the uncompression mode, image data follows a TIFF (Tag Image File Format). The TIFF is a standard format of an image file proposed by Aldus Corporation in the United States of America, and is currently supported by a lot of types of personal computers (irrespective of manufacturer). That is, a lot of types of personal computers can handle the image data conforming to the TIFF.

Figure 2B:
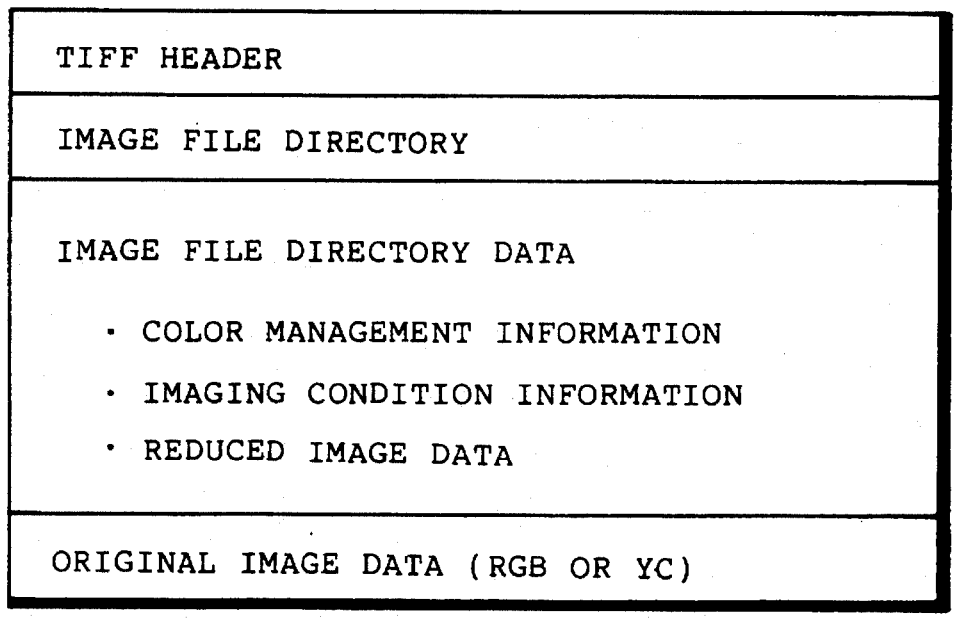
FIG. 2b shows a format of a TIFF file.

A data file conforming to the TIFF is illustrated in FIG. 2b. The TIFF file is constituted by a TIFF header, an image file directory, image file directory data, and original image data. The TIFF header includes a code representing the TIFF file. In the image file directory, the number of tags attached to various types of data subsequent thereto is described. Consequently, the position of the original image data is found. The image file directory data includes the above described user individual information such as color management information, imaging condition information and reduced image data. Tag information standardized is attached to the information and the data. Finally, the original image data is arranged. The original image data may be R, G and B data, or may be the above described Y and C data (the luminance data Y and the color difference data C).

In either one of the JPEG file and the TIFF file, the user individual information is information mainly useful to a dedicated reproducing apparatus (an apparatus for reading image data from a memory card and reproducing the same, excluding a personal computer serving as a so-called general-purpose machine). The dedicated reproducing apparatus reproduces an image more suitably utilizing the individual information. In many cases, an ordinary personal computer ignores the individual information, and performs reproduction processing in accordance with reproduction information (parameters of gamma processing or the like) previously set in the personal computer.

Figure 3:
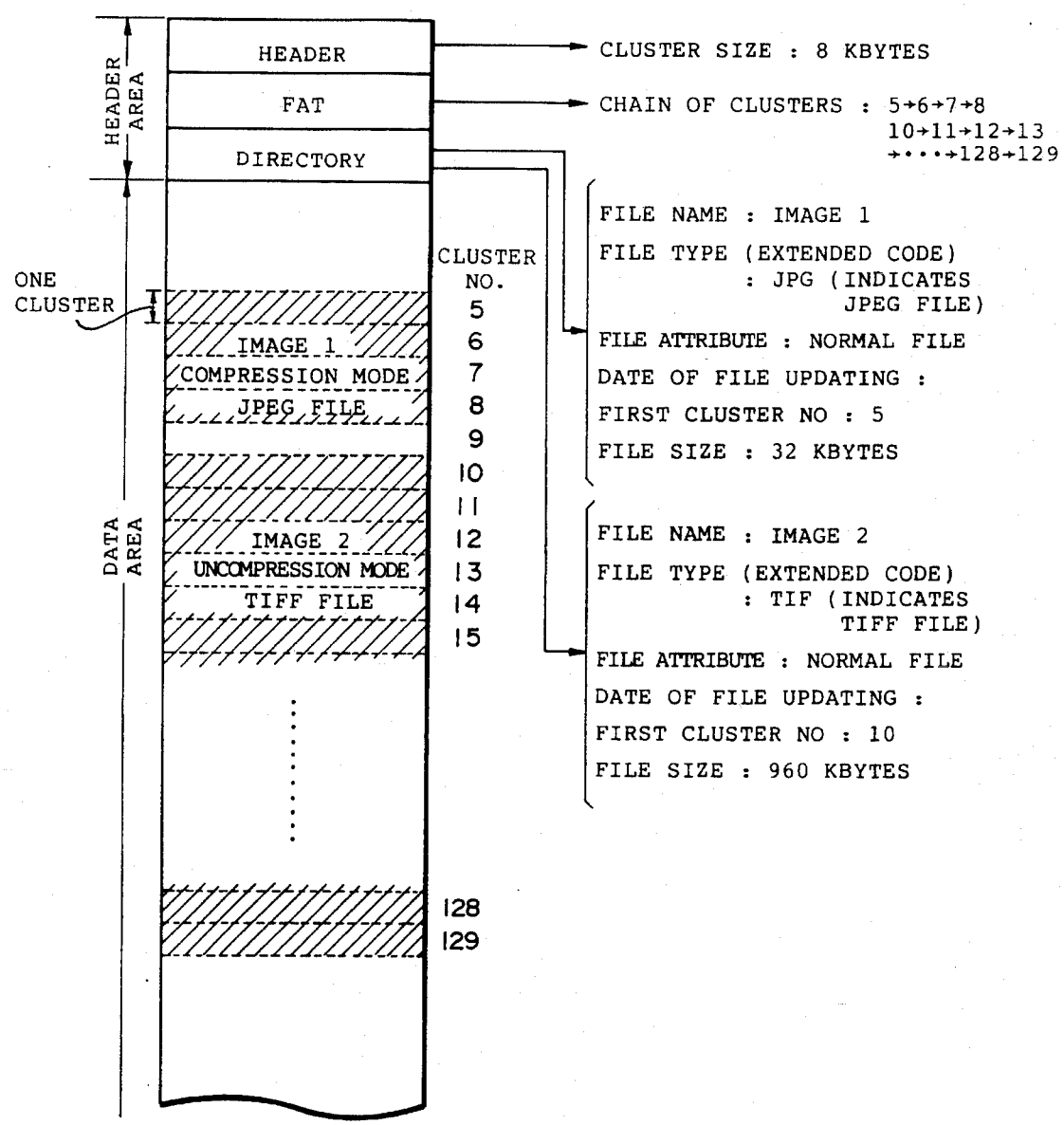
FIG. 3 shows a data file structure of a memory card conforming to a DOS-FAT format.

FIG. 3 illustrates a data recording structure (a file structure) in a memory card (a semiconductor memory in the memory card). This data recording structure (logical sector arrangement) follows a DOS-FAT (Disk Operating System-File Allocation Table) based file system. This DOS-FAT format is included in the PCMCIA (Personal Computer Memory Card International Association) Standards, and can be read by almost all personal computers at the present time.

A file of the memory card is divided into a header area and a data area. The size of the header area is previously determined. The data area is divided into a lot of clusters. Data is recorded in the data area utilizing the cluster as a unit. One cluster comprises 8 kilobytes. Each of the clusters is assigned a cluster number.

The header area comprises a header, a FAT (File Allocation Table) and a directory. The size of the cluster (= 8 kilobytes) is described in the header.

The file name of the JPEG file created in the compression mode (see FIG. 2a) is taken as IMAGE 1 and the size thereof is taken as 32 kilobytes. The JPEG file shall be stored in the clusters assigned the cluster numbers 5 to 8. On the other hand, the file name of the TIFF file created in the uncompression mode (see FIG. 2b) is taken as IMAGE 2 and the size thereof is taken as 960 kilobytes. The TIFF file shall be stored in the clusters assigned the cluster numbers 10 to 129.

A chain of clusters storing such one image file is described in the FAT in the header area. For example, the JPEG file named IMAGE 1 is stored in the clusters b 5, 6, 7and 8, so that a chain of these clusters is described. Even if one image file is recorded in not a plurality of continuous clusters but a plurality of discontinuous clusters, all image data can be read out by following the chain.

The directory in the header area stores for each image file stored in the data area the file name, the file type, the file attribute, the date of file updating, the first cluster number and the file size.

Figure 4:
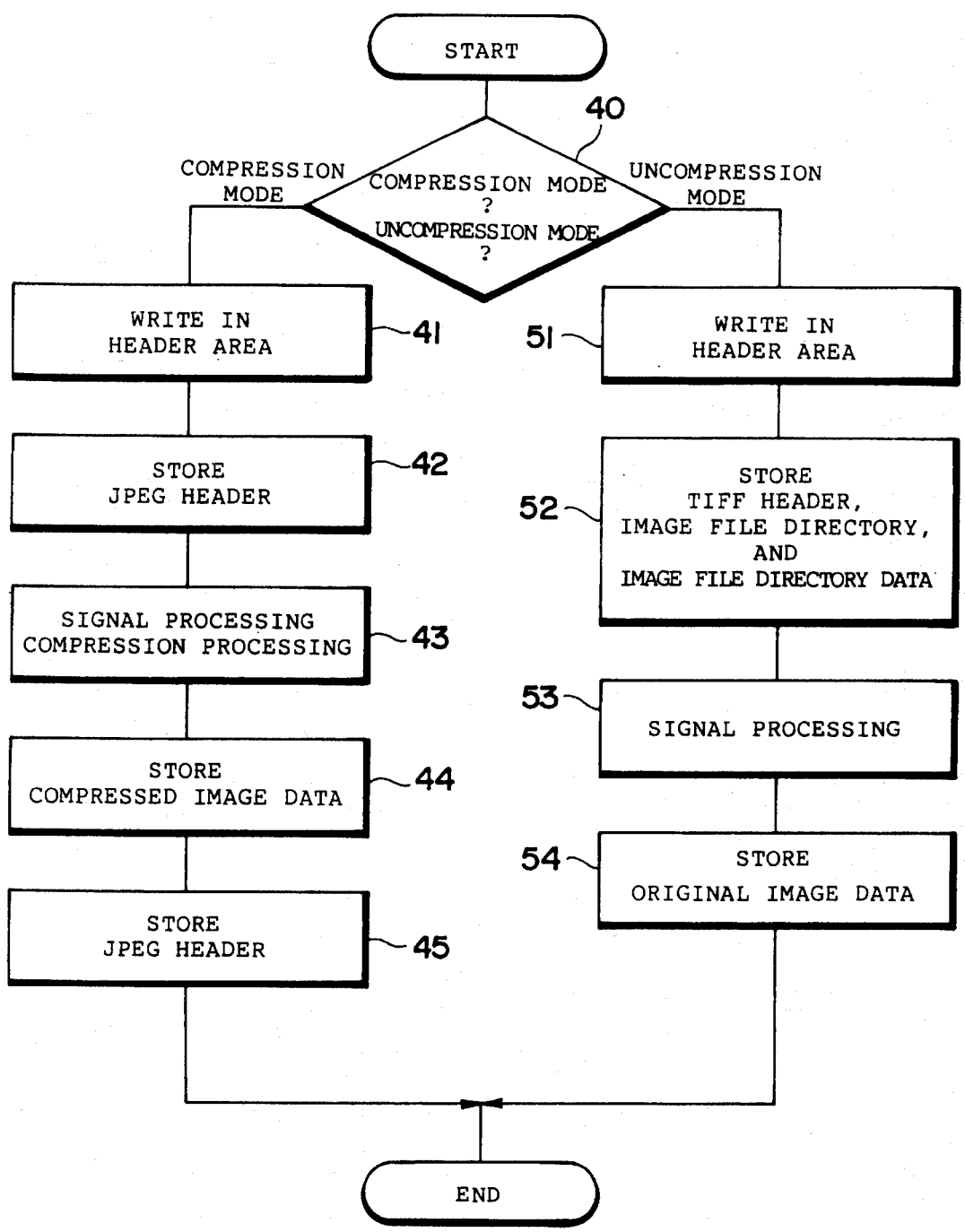
FIG. 4 is a flow chart showing the procedure for writing processing of image data into a memory card.

FIG. 4 shows the procedure for recording processing of image data in the memory card executed mainly by the control device 20. This processing is performed after the depression in the second stage of the shutter release button.

The mode set by the mode selecting switch 28 is read (step 40). The program proceeds to processing in the step 41 and the subsequent steps if the mode is the compression mode, while proceeding to processing in the step 51 and the subsequent steps if the mode is the uncompression mode.

The control device 20 directly accesses the memory card 30 through the selector 19 to write necessary data into the header area (the FAT and the directory) of the memory card 30 (steps 41 and 51). In the present embodiment, the size of compressed data obtained by compression processing of image data is previously determined. In other words, the image data is so compressed as to have a predetermined data length. In addition, the size of original image data is previously determined depending on the number of pixels in the CCD 11. Consequently, the size of the JPEG file created in the compression mode (see FIG. 2a) and the size of the TIFF file created in the uncompression mode (see FIG. 2b) are definitely determined depending on the set mode, and the numbers of clusters required to store the image files are also determined. The control device 20 accesses the header area of the memory card 30 to search for clusters in which no image file has been recorded, to determine clusters in which the image file is to be recorded. Data representing a chain of clusters in the FAT is written on the basis of the determination. Further, the file name (for example, a frame number) determined by the control device 20, the file type determined by the set mode, the first cluster number determined, and the file size determined by the set mode are written into the directory.

Fixed information in the JPEG header and the TIFF header are previously set in the memory 21 connected to the control device 20.

If the compression mode is set, the control device 20 edits the fixed information in the JPEG header previously set in the memory 21 and other information obtained by imaging and signal processing to create the JPEG headers ("start of image", application data and other data) and writes them into the previously determined clusters in the memory card 30 through the selector 19 (step 42).

During this time, in the pre-amplifier 12, the correlation double sampling circuit 13, the A/D converter 14, the RGB/YC conversion circuit 15, and the compression circuit 18, processing of a video signal obtained by imaging and compression processing of digital image data are performed (step 43).

The control device 20 writes compressed image data obtained by the compression processing in the clusters subsequently to the header information previously written by switching the selector 19 (step 44). When recording of all compressed data is terminated, the JPEG header ("end of image") is finally written (step 45).

If the uncompression mode is set, the control device 20 edits the fixed information in the TIFF header previously set in the memory 21 and other information obtained by imaging and signal processing to create the TIFF header, the image file directory and the image file directory data, and sequentially writes them in the previously determined clusters in the memory card 30 (step 52).

During this time, signal processing is performed in the circuits 12 to 15, to generate original image data, and the original image data is stored in the memory (step 53), The control device 20 switches the selector 19, to read out the original image data in the memory 17 through the memory controller 16 and writes the same into the clusters in the memory card 30 subsequently to the above written data. (step 54)

In the foregoing manner, the JPEG file including the compressed image data and the TIFF file including the original image data are respectively written into the memory card 30 in the case of the compression mode and the uncompression mode in accordance with the DOS-FAT format in either case.

It goes without saying that in the steps 42 and 52, information used in signal processing and information set in imaging serve as the color management information and the imaging condition information. In addition, reduced image data is generated from the original image data stored in the memory 17 when it is recorded in the memory card.

The writing into the header area in the step 41 or 51 may be performed after recording the JPEG header in the step 45 and recording the original image data in the step 54. This is particularly effective when the compression rate is previously determined in the compression mode and the size of the compressed image data differs for each image. In the step 41 or 51, the first cluster number may be only determined.

As many apparently widely different embodiments of the present invention can be made without departing from the spirit and scope thereof, it is to be understood that the invention is not limited to the specific embodiments thereof except as defined in the appended claims.

What is claimed is:

1. A digital electronic still camera comprising:

an original image data generation device for imaging a subject to generate original image data representing an image of the subject;

a data compression circuit for compressing said original image data in accordance with a JPEG system to generate compressed image data;

a mode setting device for setting either one of a compression mode and an uncompression mode;

a memory previously storing fixed information of a JPEG header for the compressed image data and fixed information of a TIFF header for the original image data; and an image data writing device for starting said data compression circuit to generate the compressed image data and writing the compressed image data and the fixed information of the JPEG header stored in said memory into a memory card in a DOS-FAT data file structure so that a JPEG file is formed when the compression mode is set, while writing the original image data obtained from said original image data generation device and the fixed information of the TIFF header stored in said memory into the memory card in the DOS-FAT data file structure so that a TIFF file is formed when the uncompression mode is set.

2. A digital electronic still camera in which a memory card is freely loadable/unloadable for writing image data into the memory card in a standard data file structure which can be read by a plurality of types of personal computers, comprising:

an original image data generation device for imaging a subject to generate original image data representing an image of the subject;

a data compression circuit for compressing said original image data in accordance with a data compression algorithm which can be handled by the plurality of types of personal computers to generate compressed image data;

a mode setting device for setting either one of a compression mode and an uncompression mode;

a storage device for storing fixed information of a first header of a first format for the compressed image data which can be handled by the plurality of types of personal computers and fixed information of a second header of a second format for the original image data which can be handled by the plurality of types of personal computers; and an image data writing device for starting said data compression circuit to generate the compressed image data and writing the compressed image data and the fixed information of the first header stored in said storage device into the memory card so that a file conforming to the first format is formed when the compression mode is set, while writing the original image data obtained from said original image data generation device and the fixed information of the second header stored in said storage device into the memory card so that a file conforming to the second format is formed when the uncompression mode is set.

3. A digital electronic still camera comprising:

original image data generation means for imaging a subject to generate original image data representing an image of the subject;

data compression means for compressing said original image data in accordance with a JPEG system to generate compressed image data;

mode setting means for setting either one of a compression mode and an uncompression mode;

storage means previously storing fixed information of a JPEG header for the compressed image data and fixed information of a TIFF header for the original image data; and image data writing means for starting said data compression means to generate the compressed image data and writing the compressed image data and the fixed information of the JPEG header stored in said storage means into a memory card in a DOS-FAT data file structure so that a JPEG file is formed when the compression mode is set, while writing the original image data obtained from said original image data generation means and the fixed information of the TIFF header stored in said storage means into the memory card in the DOS-FAT data file structure so that a TIFF file is formed when the uncompression mode is set.

4. A digital electronic still camera in which a memory card is freely loadable/unloadable for writing image data into the memory card in a standard data file structure which can be read by a plurality of types of personal computers, comprising:

original image data generation means for imaging a subject to generate original image data representing an image of the subject;

data compression means for compressing said original image data in accordance with a data compression algorithm which can be handled by the plurality of types of personal computers to generate compressed image data;

mode setting means for setting either one of a compression mode and an uncompression mode;

storage means for storing fixed information of a first header of a first format for the compressed image data which can be handled by the plurality of types of personal computers and fixed information of a second header of a second format for the original image data which can be handled by the plurality of types of personal computers; and image data writing means for starting said data compression means to generate the compressed image data and writing the compressed image data and the fixed information of the first header stored in said storage means into the memory card so that a file conforming to the first format is formed when the compression mode is set, while writing the original image data obtained from said original image data generation means and the fixed information of the second header stored in said storage means into the memory card so that a file conforming to the second format is formed when the uncompression mode is set.

5. In a digital electronic still camera in which a memory card is freely loadable/unloadable for writing image data into the memory card in a standard DOS-FAT data file structure which can be read by a plurality of types of personal computers, a method of writing image data into the memory card in the digital electronic still camera, comprising the steps of:

previously setting fixed information of a JPEG header for compressed image data and fixed information of a TIFF header for original image data;

imaging a subject in response to a shutter release signal to generate the original image data representing an image of the subject;

judging which of a compression mode and an uncompression mode is set;

compressing the generated original image data in accordance with a JPEG system and writing the compressed image data and said fixed information of the JPEG header into the memory card so that a JPEG file is formed when the judging step determines that the compression mode is set; and writing the generated original image data and said fixed information of the TIFF header into the memory card so that a TIFF file is formed when the judging step determines that the uncompression mode is set.

6. The digital electronic still camera as recited in claim 1, wherein both the original image data and the compressed image data are stored in the memory card.

7. The digital electronic still camera as recited in claim 2, wherein both the original image data and the compressed image data are stored in the memory card.

8. The digital electronic still camera as recited in claim 3, wherein both the original image data and the compressed image data are stored in the memory card.

9. The digital electronic still camera as recited in claim 4, wherein both the original image data and the compressed image data are stored in the memory card.

10. The method as recited in claim 5, further comprising forming both the JPEG file and the TIFF file in the memory card.

11. The method as recited in claim 5, further comprising writing a file size of the JPEG file to the JPEG header after the writing of the compressed image data and writing a file size of the TIFF file to the TIFF header after the writing of the original image data.

* * * * *